United States Patent
Kumar

(10) Patent No.: US 7,363,094 B2
(45) Date of Patent: Apr. 22, 2008

(54) MULTIVARIABLE CONTROLLER DESIGN METHOD FOR MULTIPLE INPUT/OUTPUTS SYSTEMS WITH MULTIPLE INPUT/OUTPUT CONSTRAINTS

(75) Inventor: Aditya Kumar, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/327,963

(22) Filed: Jan. 9, 2006

(65) Prior Publication Data

US 2007/0162161 A1 Jul. 12, 2007

(51) Int. Cl.
  G05B 13/02 (2006.01)
(52) U.S. Cl. ....................................... 700/29
(58) Field of Classification Search ................ 700/29, 700/44
  See application file for complete search history.

(56) References Cited

U.S. PATENT DOCUMENTS

| | | | | |
|---|---|---|---|---|
| 5,384,698 A * | 1/1995 | Jelinek | | 700/29 |
| 5,446,648 A * | 8/1995 | Abramovitch et al. | | 700/53 |
| 5,456,870 A * | 10/1995 | Bulgrin | | 264/40.6 |
| 5,486,996 A * | 1/1996 | Samad et al. | | 700/32 |
| 5,519,605 A * | 5/1996 | Cawlfield | | 700/31 |
| 5,796,606 A * | 8/1998 | Spring | | 700/9 |
| 5,893,055 A * | 4/1999 | Chen | | 702/189 |
| 5,920,478 A * | 7/1999 | Ekblad et al. | | 700/29 |
| 6,565,729 B2 * | 5/2003 | Chen et al. | | 205/82 |
| 6,587,744 B1 * | 7/2003 | Stoddard et al. | | 700/121 |
| 6,631,299 B1 * | 10/2003 | Patel et al. | | 700/37 |
| 6,684,112 B1 * | 1/2004 | Cheng | | 700/28 |
| 6,684,115 B1 * | 1/2004 | Cheng | | 700/45 |
| 6,721,608 B1 * | 4/2004 | Rutherford | | 700/28 |
| 6,823,253 B2 * | 11/2004 | Brunell | | 701/100 |
| 6,823,675 B2 | 11/2004 | Brunell et al. | | |
| 6,865,441 B2 * | 3/2005 | Chandhoke | | 700/189 |
| 6,882,889 B2 * | 4/2005 | Fuller et al. | | 700/44 |
| 6,917,840 B2 * | 7/2005 | Lund | | 700/33 |
| 6,937,908 B2 * | 8/2005 | Chang et al. | | 700/37 |
| 7,016,743 B1 * | 3/2006 | Cheng | | 700/45 |
| 7,035,694 B2 * | 4/2006 | Ramamoorthy et al. | | 700/18 |
| 7,050,880 B2 * | 5/2006 | de Roover et al. | | 700/121 |

(Continued)

FOREIGN PATENT DOCUMENTS

EP 1447727 8/2004

(Continued)

OTHER PUBLICATIONS

"Introduction to Closed-Loop Control", Michael Barr, 2002, CMP Media, LLC.*

(Continued)

Primary Examiner—Michael B. Holmes
(74) Attorney, Agent, or Firm—Penny A. Clarke; Patrick K. Patnode

(57) ABSTRACT

A method for dynamically controlling a multiple input, multiple output (MIMO) system having multiple input and output constraints, the method comprising. In an exemplary embodiment, the method includes configuring a MIMO tracking controller to implement closed loop tracking of multiple control reference inputs of the system, in the absence of input and output constraints, and configuring a MIMO constraint controller to enforce the input and output constraints of the MIMO system by generating a reference modification applied to the multiple control reference inputs.

21 Claims, 3 Drawing Sheets

U.S. PATENT DOCUMENTS

| | | | |
|---|---|---|---|
| 7,117,045 B2 * | 10/2006 | Hittle et al. | 700/48 |
| 7,123,973 B2 * | 10/2006 | Rutherford | 700/53 |
| 7,158,840 B2 * | 1/2007 | Jacques | 700/28 |
| 2004/0107013 A1 | 6/2004 | Fuller et al. | |
| 2005/0193739 A1 * | 9/2005 | Brunell et al. | 60/772 |

FOREIGN PATENT DOCUMENTS

| | | |
|---|---|---|
| EP | 1538319 | 8/2005 |

OTHER PUBLICATIONS http://en.wikipedia.org/wiki/Kalman_Filter.*

Michael W. Oppenheimer et al. "On-Line Adaptive Estimation and Trajectory Reshaping", Ajay Verma Knowledge Based System, Inc.Oct. 2005.*

Multivariable gyroscope control by individual channel design Liceaga, J.; Liceaga, E.; Amezquita, L.; Control Applications, 2005. CCA 2005. Proceedings of 2005 IEEE Conference on Aug. 28-31, 2005 pp. 785-790 Digital Object Identifier 10.1109/CCA.2005.1507224.*

On-line control performance monitoring of MIMO processes Biao Huang; Shah, S.L.; Kwok, E.K.; American Control Conference, 1995. Proceedings of the vol. 2, Jun. 21-23, 1995 pp. 1250-1254 vol. 2.*

Neural servocontroller for nonlinear MIMO plant Ahmed, M.S.; Tasadduq, I.A.; Control Theory and Applications, IEEE Proceedings-vol. 145, Issue 3, May 1998 pp. 277-290.*

Controller tuning methods for industrial boilers Katebi, M.R.; Moradi, A.H.; Johnson, M.A.; Industrial Electronics Society, 2000. IECON 2000. 26th Annual Confjerence of the IEEE vol. 2, Oct. 22-28, 2000 pp. 1457-1462 vol. 2 Digital Object Identifier 10.1109/IECON.2000.972336.*

A systematic controller-design approach for neutral-point-clamped three-level inverters Espinoza, J.E.; Espinoza, J.R.; Moran, L.A.; Industrial Electronics, IEEE Transactions on vol. 52, Issue 6, Dec. 2005 pp. 1589-1599 Digital Object Identifier 10.1109/TIE.2005.858719.*

M.C. Wu et al., "Weighted switching lifted digital redesign with state saturation for cascaded analog systems," XP002442982, IMA Journal of Mathematical Control and Information, vol. 20, 2003, pp. 65-87.

EP Search Report, EP 07101039, Jul. 18, 2007.

* cited by examiner

MULTIVARIABLE CONTROLLER DESIGN METHOD FOR MULTIPLE INPUT/OUTPUTS SYSTEMS WITH MULTIPLE INPUT/OUTPUT CONSTRAINTS

STATEMENT OF GOVERNMENT INTEREST

This invention was made with U.S. Government support under Government Contract No.: N00019-96-C0176. The U.S. Government has certain rights in this invention.

BACKGROUND OF THE INVENTION

The present disclosure relates generally to multivariable input/output control designs and, more particularly, to a multivariable controller design method for multiple input/output systems with multiple input and/or output constraints.

All practical control systems have constraints on the inputs or control actuators of the system (e.g., due to hardware limitations). Moreover, there are often multiple state/output constraints on the system as a result of certain safety and/or operability concerns. The majority of industrial control system applications with input/output constraints are generally limited to single-input single-output (SISO) systems or multi-input multi-output (MIMO) systems with low input-output interaction. Most of such controllers include the use of integral action to account for constant modeling errors and unknown disturbances. However, it is well known that the presence of such integral actions lead to the "windup" phenomenon in the presence of actuator constraints, wherein the control actuator saturates at the max/min limit, while the integral action remains active and builds up, leading to performance degradation, or worse, instability. A common approach to overcome this issue due to actuator (input) constraints is to simply terminate the integral action (i.e., stop updating the integral term) upon actuator saturation.

Although this simple approach is often sufficient for SISO systems with actuator saturation, its straightforward extension to MIMO systems with multiple actuators and corresponding minimum/maximum (min/max) constraints by individually limiting the corresponding integral term on each actuator has serious limitations. In particular, multivariable controllers for MIMO systems rely on the coordination between the multiple actuators to achieve the desired control objectives. However, the individual saturation of the integral term on each actuator does not account for the desired coordinated interaction desired between all the actuators. Thus, this simple technique of individually limiting the integral action on each actuator is often inadequate for MIMO systems, and leads to significant performance loss or even instability. More sophisticated techniques for providing "anti-windup" or "windup compensation" for MIMO systems with multiple actuators and min/max saturation limits employ the use of an "anti-windup" controller that is active only when the actuators saturate at a min/max limit. More specifically, for a general MIMO nonlinear system with a state-space description of the form:

$$\dot{x} = f(x,u)$$

$$y = h(x,u) \qquad \text{Eq. 1}$$

with states $x \in \Re^n$, control inputs (actuators) $u \in \Re^{mu}$, and controlled outputs $y \in \Re^{my}$ (considering only square control systems with mu=my), a dynamic multivariable controller with integral action and anti-windup protection has a following general form:

$$\dot{x}_c = f_c(x_c, x, y) + L(u - \text{sat}(u))$$

$$u = h_c(x_c, x, y) + M(u - \text{sat}(u)) \qquad \text{Eq. 2}$$

with the controller states $x_c \in \Re^{nc}$ and anti-windup gains L & M. These anti-windup gains act upon the difference (u−sat(u)), where $$\text{sat}(u) = u, \text{ if } u_{min} < u < u_{max}$$

$$= u_{min}, \text{ if } u \leq u_{min}$$

$$= u_{max}, \text{ if } u \geq u_{max} \qquad \text{Eq. 3}$$

denotes the standard saturation operator. As can be seen, the anti-windup terms are active only on saturation when one or more of the actuators u saturate at a min or max limit. In most cases, the anti-windup gain M is set to 0, while the anti-windup gain L is designed to enforce performance/stability in the presence of actuator saturation. The design of such multivariable controllers with multivariable anti-windup protection for integral action in the presence of single/multiple actuator saturation has been a subject of considerable research and is fairly mature.

Unfortunately, there is no analytical control design technique available for MIMO systems having output (or state) constraints. The majority of control system applications with output constraints in industrial applications are limited to SISO systems or MIMO systems with very little input-output interaction, i.e., all output constraints are dominantly affected by a single common actuator.

BRIEF DESCRIPTION OF THE INVENTION

The above discussed and other drawbacks and deficiencies of the prior art are overcome or alleviated by a method for dynamically controlling a multiple input, multiple output (MIMO) system having multiple input and output constraints, the method comprising. In an exemplary embodiment, the method includes configuring a MIMO tracking controller to implement closed loop tracking of multiple control reference inputs of the system, in the absence of input and output constraints, and configuring a MIMO constraint controller to enforce the input and output constraints of the MIMO system by generating a reference modification applied to the multiple control reference inputs.

In another embodiment, a control architecture for a multiple input, multiple output (MIMO) system having multiple input and output constraints includes a MIMO tracking controller configured to implement closed loop tracking of multiple control reference inputs of the system, in the absence of input and output constraints, and a MIMO constraint controller configured to enforce the input and output constraints of the MIMO system by generating a reference modification applied to the multiple control reference inputs.

In still another embodiment, a storage medium includes a machine readable computer program code for dynamically controlling a multiple input, multiple output (MIMO) system having multiple input and output constraints, and instructions for causing a computer to implement a method. The method further includes configuring a MIMO tracking controller to implement closed loop tracking of multiple control reference inputs of the system, in the absence of input and output constraints, and configuring a MIMO constraint controller to enforce the input and output constraints of the MIMO system by generating a reference modification applied to the multiple control reference inputs.

BRIEF DESCRIPTION OF THE DRAWINGS

Referring to the exemplary drawings wherein like elements are numbered alike in the several Figures.

DETAILED DESCRIPTION OF THE INVENTION

Disclosed herein is a novel approach for the design of multivariable controllers for MIMO systems having multiple input and/or output constraints. There are several methodologies presently available for the design of multivariable controllers for MIMO systems, ranging from input-output pairing with multi-loop controllers, to multi-loop controllers with sequential loop closure, to full multivariable controllers that account for increasing multivariable input-output interaction. However, such controllers are designed without consideration of any input/output constraints and do not provide stability/performance in the presence of such constraints.

Figure 1:
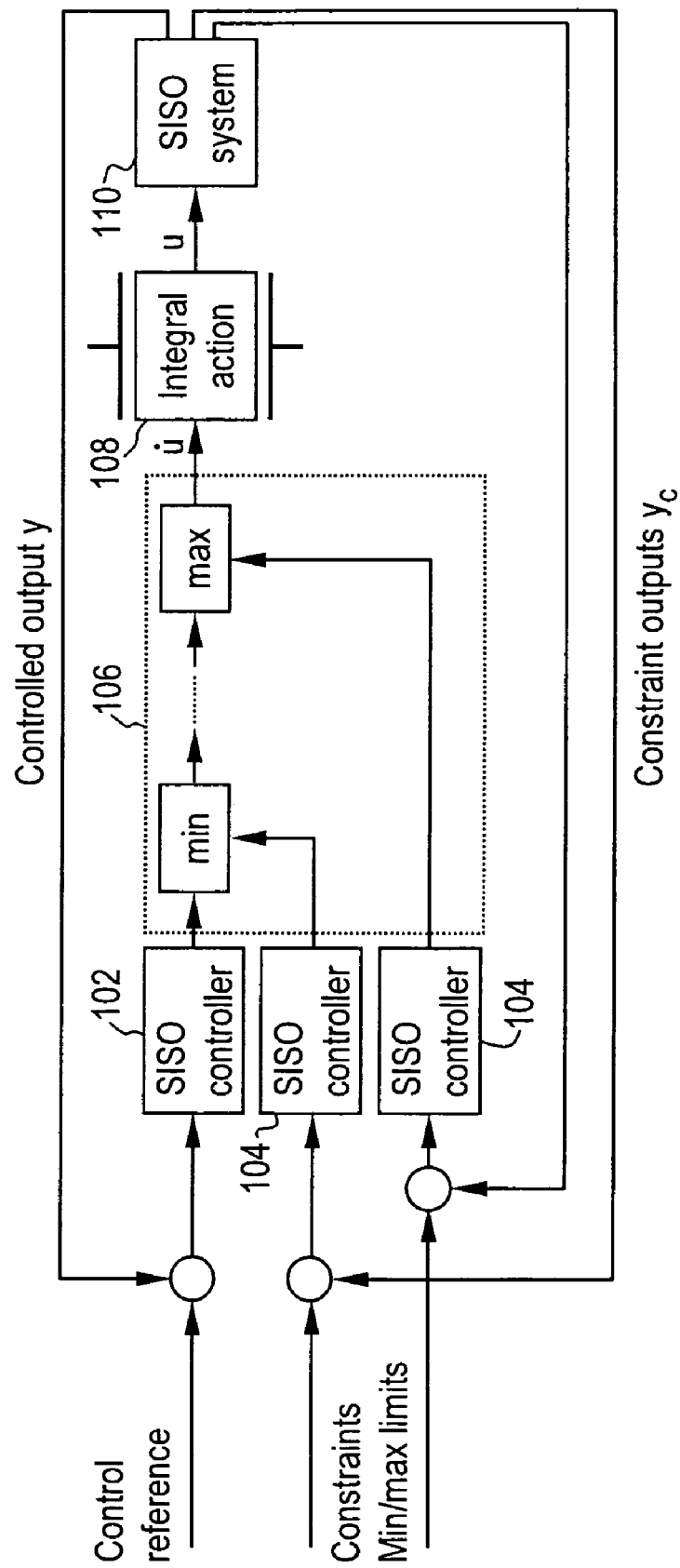
FIG. 1 is a schematic block diagram illustrating the overall architecture of an existing control technique for SISO systems with output constraints.

Referring now to FIG. 1, a schematic block diagram illustrating the overall architecture of an existing control technique for SISO systems with output constraints is shown. Specifically, FIG. 1 illustrates the design of a main SISO regulator 102 for the primary controlled output y, as well as individual SISO regulators 104 for each min/max limit on constraint outputs $y_c$. These individual regulators 102, 104 are implemented in parallel and then followed by a sequence of min/max selection logic 106 to actively determine which SISO regulator is currently active. The selection logic 106 enables the primary control output regulator 102 if no output min/max constraint is currently active, otherwise it uses the min/max logic to decide which min/max constraint limit is the most limiting and is "selected" as the active control loop.

The output of these min/max selection logic blocks is passed through a common integrator 108 (to provide integral action) and then provided as the input to the process (SISO system) 110. The common integrator 108 typically includes the simple "anti-windup" scheme of limiting the integral term upon saturation of the control actuator u at a min/max limit. Again, this approach is limited to SISO systems with a single actuator or MIMO systems with very small input-output interaction where the primary control output y and the constraint outputs $y_c$ are all dominantly affected by a common actuator u. However, it is not applicable to truly MIMO systems with significant input-output interaction, wherein multiple control actuators have significant effect on the control outputs y, as well as the constraint outputs $y_c$.

Accordingly, the present disclosure introduces a novel control design approach for MIMO systems with multiple input (actuator) and output constraints, wherein single/multiple input and/or output constraints can be simultaneously enforced while systematically trading off performance on less important control outputs compared to more important control outputs. The only known technique available in the art that is applicable to such MIMO systems with multiple input and output constraints is model predictive control (MPC), which entails an online receding horizon constrained optimization problem, wherein a desired performance objective is optimized subject to any input and/or output constraints.

While MPC has been actively researched and has found applications predominantly in the chemical process industry, its application to more high performance systems with fast dynamics is seriously limited due to the very high computational cost involved in solving a constrained optimization problem online in real time. Despite the advent of very fast computing facilities, MPC is still orders of magnitude too computationally expensive for real-time implementations in complex high-performance applications with fast transients.

The dynamics of a general MIMO system is described by the following state-space form:

$$\dot{x}=f(x,u)$$

$$y=h(x,u)$$

$$y_c=h_c(x,u) \quad \text{Eq. 4}$$

which is similar to the system in Eq. 1, with the addition of the constraint outputs $y_c \in \mathfrak{R}^{n_{yc}}$ with min/max limits $y_{c,min}$ & $y_{c,max}$. Additionally, the control inputs u (actuators) have min/max limits $u_{min}$ & $u_{max}$. The embodiments described hereinafter enforce the multiple input and output constraints in a unified framework, providing multivariable anti-windup protection for the controller integral action and allow simultaneously enforcing multiple input/output constraints while systematically trading off control performance on less important control outputs in comparison to the more important ones.

Figure 2:
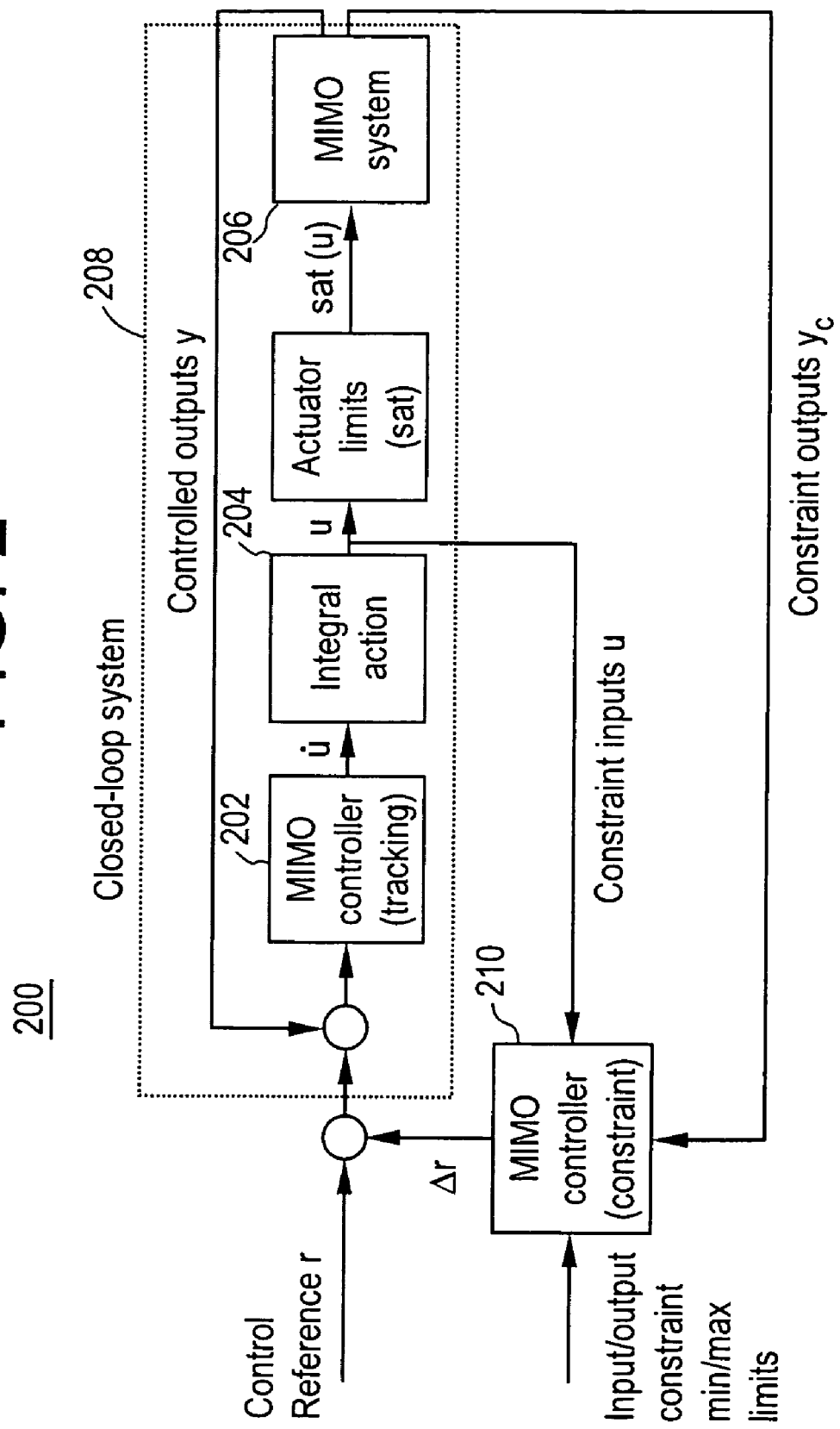
FIG. 2 is a schematic block diagram of the overall architecture of a MIMO control design for MIMO systems with input & output constraints, in accordance with an embodiment of the invention.

Referring now to FIG. 2, there is shown a schematic block diagram of the overall architecture 200 of a MIMO control design for MIMO systems with input & output constraints, in accordance with an embodiment of the invention. In a first step, a MIMO controller 202 is designed to achieve closed-loop tracking with desired performance in the absence of any input or output constraints. For the MIMO tracking controller 202, any available control design methodology can be used. In particular, the MIMO tracking controller includes integral action 204 by including an integrator on each actuator u, or equivalently, treating u as the control input for an extended system consisting of the original state-space system in Eq. 4 and the system of integrators:

$$\dot{u}=v \quad \text{Eq. 5}$$

The resulting MIMO tracking controller can be described by the following state-space system:

$$\dot{x}^c=f^c(x^c,x,e)$$

$$v=h^c(x^c,x,e) \quad \text{Eq.6}$$

where $x^c \in \mathfrak{R}^{n_c}$ denotes the states of the MIMO tracking controller (e.g., lead-lag states), and $e=(r_{total}-y)=(r+\Delta r-y)$ denotes the control error between the total reference $r_{total}=r+\Delta r$ and the control output feedback. The total reference includes the nominal control reference r and the reference modification $\Delta r$ (obtained from the MIMO constraint controller and described later). The controller explicitly includes the integral action on each actuator and thus for each controlled output. It will be noted that the MIMO tracking controller 202 may also be a linear controller with the functions $f$ & $h^c$ being correspondingly given by linear functions. The MIMO tracking controller 202, together with the dynamic model of the MIMO process 206 (in Eq. 4) yield the closed-loop MIMO system 208:

$$\dot{x}_{cl} = f_{cl}(x_{cl}, r + \Delta r)$$

$$y_{cl} = h_{cl}(x_{cl}, r + \Delta r)$$

$$y_{cl,c} = h_{cl,c}(x_{cl}, r + \Delta r)$$

$$u = h_{cl,u}(x_{cl}, r + \Delta r) \quad \text{Eq. 7}$$

with desired tracking performance in the absence of any constraints. It will be noted that in the closed-loop system 208, the original constraint outputs $y_c$ as well as the constraint inputs u are included. This allows treating both input and output constraints in the same manner in a unified approach.

Once the MIMO tracking controller 202 is designed and a model for the corresponding closed-loop system 208 is obtained, the present methodology further entails the design of a MIMO constraint controller 210 to enforce the input and output constraints through the use of the control reference modifications $\Delta r$ applied to the closed-loop system 208. In particular, if none of the input or output constraints are active (i.e., violating the corresponding min/max limits), then the MIMO constraint controller 210 is deactivated, (i.e., $\Delta r = 0$) and the nominal tracking performance is obtained. On the other hand, if one or more input or output constraints are active, then the MIMO constraint controller 210 calculates the appropriate reference modification $\Delta r$ to enforce these active constraints.

In the present approach, the individual integrators 204 on each actuator (to provide integral action) are not limited as in the simple "anti-windup" approach. Rather, these integrators are allowed to violate any input max/min limits. The input constraint limits are instead enforced by the MIMO constraint controller, which provides a multivariable anti-windup, wherein all un-saturated actuators are still used in a coordinated manner while the saturated actuators are maintained at the max/min limit. As a result of this multivariable anti-windup, the present approach performs better than simple integrator limiting for input (actuator) constraints.

One of the challenges in designing the MIMO constraint controller 210 is that the number and combination of input and output constraints that are active at any time instant will change. For instance, at a nominal operating point, none of these constraints may be active. However, during a fast transient, one or more input and/or output constraints may become active at different points in time. This poses an immediate problem for conventional approaches involving off-line control design coupled with on-line scheduling. One would have to design an inordinately large number of off-line controllers for all possible combinations of active constraints, which will grow exponentially with the number of input and output constraints. Thus, such an approach is not practically feasible.

Accordingly, the present embodiments utilize an online model-based controller design approach that can be calculated online (and implemented in real time) depending on the number and combination of active constraints at each time sample. In an exemplary embodiment, a dynamic inversion (DI) approach is implemented to address the constraint controller design. Thereby, a linear approximation of the nonlinear closed-loop system 208 is obtained at each time sample, and the DI-based controller for this linear system is designed. The linear model is updated at each time sample to account for system nonlinearities.

More specifically, the linear model for the closed-loop system 208 is obtained with the following general description:

$$\dot{x}_{cl} = A x_{cl} + B(r + \Delta r) + f$$

$$y = C x_{cl} + D(r + \Delta r)$$

$$y_c = C_{yc} x_{cl} + D_{yc}(r + \Delta r),$$

$$u = C_u x_{cl} + D_u(r + \Delta r) \quad \text{Eq. 8}$$

with the closed-loop states $x_{cl}$ including the states of the process, the integrators 204 and the MIMO tracking controller 202. In the above description, the variables $x_{cl}$, y, $y_c$ & u denote deviations from the current absolute values, with a slight alteration of notation to avoid notational complexities. Also, the term $f$ in the state dynamic equation denotes the free response term obtained from linearizing the system at the current point, which is zero if the current point is a steady-state; otherwise, it is non-zero and reflects the state derivative for the existing control action. The MIMO constraint controller 210 is designed and implemented in discrete time, thus the closed-loop linear model is converted to a discrete time model:

$$x_{cl,k+1} = A x_{cl,k} + B(r_k + \Delta r_k) + F_k$$

$$y_k = C x_{cl,k} + D(r_k + \Delta r_k)$$

$$Y_{c,k} = C_c x_{cl,k} + D_c(r_k + \Delta r_k) \quad \text{Eq. 9}$$

For simplicity purposes, the input constraints u and the original output constraints $y_c$ are combined in an extended output $Y_c$, since the input and output constraints are treated the same way in the proposed approach. Also, if the baseline MIMO tracking controller 202 is calculated and implemented in discrete time (as is often the case), then the above discrete-time linear model of the closed-loop system is obtained by discretizing the linear approximation of the process and combining with the linear approximation of the discrete-time MIMO tracking controller.

For the linearized discrete-time system in Eq. 9 describing the closed-loop system 208, a MIMO controller is thereby designed using the reference modifications $\Delta r$ as control inputs to enforce all the active (input & output) $Y_c$ at their respective min/max limits. At any instant in time, an input/output constraint $Y_{ci}$ is active if it is at or exceeding the corresponding min/max limit. The subset of constraints $Y_c$ that is currently active, may be easily identified by comparing each constraint $Y_{ci}$ against the respective min/max limit. However, some lead to anticipate which constraints may become active in the "near" future is included, especially for constraints that have fast dynamics and change rapidly.

In the absence of any lead or anticipation, determining a constraint to be active based solely on its current value may be too late, since by the time the MIMO constraint controller responds to the constraint becoming active, the constraint (especially fast varying ones) will have shot significantly beyond the min/max limit. To avoid this problem, suitable lead/anticipation may be easily incorporated by predicting the constraints $Y_c$ a desired time ahead in the future by using the model of the closed-loop system 208 in continuous time (Eq. 8) or discrete time (Eq. 9), and comparing the predicted values against the min/max limits for possible violation.

Once the subset of currently active constraints $Y_c$ is identified based on appropriate prediction (which can be tuned for each constraint output/input), the MIMO constraint controller 210 can be designed to maintain these active constraints at the respective min/max limit where it is active.

An immediate complication in using standard dynamic inversion (DI) for the present constraint controller design is that the resulting system will, most often, be a non-square system. In particular, while the number of reference modifications $\Delta r$ (or control inputs for this MIMO constraint controller) is fixed at $m_u$, the number of active constraints will change with time and may be (i) less than $m_u$, or (ii) equal to $m_u$, or (iii) larger than $m_u$. Moreover, in general, specific combinations of active input and/or output constraints may lead to a MIMO system with non-minimum phase behavior (i.e., transmission zeros in the complex right-half plane in continuous time or outside the unit circle in discrete-time). Analogously, the zero-output constrained dynamics, or simply zero dynamics, of nonlinear systems is unstable. Standard DI controller design is applicable to square systems with an equal number of control inputs and controlled outputs. In addition, standard DI will lead to closed-loop/internal instability for non-minimum phase systems.

Both of the above described problems are overcome in the present embodiments by employing a modified or "robust" DI, which entails the combination of a DI approach with a linear quadratic regulator (LQR) approach. A suitable example of a robust DI approach is described hereinafter.

In either the closed-loop system in continuous time (Eq. 8) or in discrete time (Eq. 9), the relative degree (or relative order) $r_i$ for each constraint output $Y_{ci}$ (to be controlled by the MIMO constraint controller 210 at the min/max limit when active) is defined in the standard way as the number of times the output has to be differentiated (in continuous time) until it explicitly depends on one or more control input, i.e., the reference modification $\Delta r$. Equivalently, in discrete time, the relative degree $r_i$ is defined as the minimum number of time samples ahead in the future the constraint output $Y_{ci}$ is affected by a change in one or more input, i.e., the reference modification $\Delta r$. For the sake of simplicity, systems where the relative degree $r_i = 1$ are considered, although the present approach is easily extended to systems with higher relative degree in a straightforward manner. For such systems, by definition, it follows that $C_{ci}*B$ is a non-zero row vector for each constraint output $Y_{ci}$. Moreover, the resulting matrix $C_c*B$ is assumed to be full row/column rank, or non-singular for square systems as in standard DI. The matrix $C_c*B$ is often called the decoupling matrix for the MIMO system, and it characterizes the degree of dynamic input-output coupling in the system. For instance, in a perfectly decoupled system, it would be a diagonal matrix (with possibly some rearrangement of the inputs & outputs).

For a square discrete time system in Eq. 9, with relative degree $r_i = 1$ for all outputs $Y_{ci}$, the standard DI controller design entails enforcing a first-order response of the form:

$$Y_{c,k+1} = \alpha Y_{c,k} + (1-\alpha) r_{c,k}, \quad \text{Eq. 10}$$

where $r_{ck}$ denotes the target setpoint for the constraint output $Y_c$, i.e., the min/max limit at which it is currently active, and $\alpha$ reflects the desired time constant(s) for the first-order response in these outputs. The resulting controller to enforce this first-order response is easily derived on the basis of the discrete-time model of the system in Eq. 9:

$$\Delta r_k = (C_c B)^{-1} \{\alpha Y_{c,k} + (1-\alpha) r_{ck} - C_c A x_{cl,k} - C_c B r_k - C_c F_k\} \quad \text{Eq. 11}$$

The need for the decoupling matrix $C_c*B$ for being square & invertible is noted in the above standard DI controller. The proposed modified "robust" DI approach thus entails (i) pre-filtering the reference, i.e., the constraint min/max limits $r_{ck}$ with the same first-order filter:

$$r_{cf,k+1} = \alpha r_{cf,k} + (1-\alpha) r_{ck}, \quad \text{Eq. 12}$$

where $r_{cf,k}$ denotes the pre-filtered reference, and (ii) designing the controller to minimize the following quadratic objective function:

$$\min \lfloor (r_{cf,k+1} - Y_{c,k+1})^T Q (r_{cf,k+1} - Y_{c,k+1}) + \Delta r_k^T R \Delta r_k \rfloor \quad \text{Eq. 13}$$

It will be noted that the above quadratic objective is similar to the linear quadratic regulator (LQR) with a quadratic penalty on tracking (in this case, constraint violation through a positive definite weighting matrix Q), and a quadratic penalty on the control action (in this case, the reference modification $\Delta r_k$, through the positive definite weighting matrix R). The above minimization problem has an explicit analytical solution:

$$\Delta r_k = [(C_c B)^T Q (C_c B) + R]^{-1} (C_c B)^T Q (r_{cf,k+1} - C_c A x_{cl,k} - C_c B r_k - C_c F_k) \quad \text{Eq. 14}$$

Using the relation in Eq. 13 for the first-order reference pre-filter, and the realization that under nominal tracking of the desired first-order response, $Y_{c,k} = r_{cf,k}$, the above controller reduces to:

$$\Delta r_k = [(C_c B)_T Q (C_c B) + R]^{-1} (C_c B)^T Q \{\alpha Y_{c,k} + (1-\alpha) r_{ck} - C_c A x_{cl,k} - C_c B r_k - C_c F_k\}, \quad \text{Eq. 15}$$

which is very similar to the standard DI controller in Eq. 11, except that the inverse of the dynamic decoupling matrix, i.e., $(C_c B)^{-1}$ is replaced by the weighted pseudo-inverse $[(C_c B)^T Q (C_c B) + R]^{-1} (C_c B)^T Q$ that corresponds to a weighted least squares minimization in Eq. 13. This weighted pseudo-inverse matrix exists and is well-defined for any square/non-square system as long as R is positive definite. This allows overcoming the first obstacle of square systems for standard DI in the design of the MIMO constraint controller with variable number of active constraints. Also, the above described controller 210 provides stability for positive definite weighting matrices Q & R, under the standard LQR assumptions of stabilizability and is not restricted to minimum-phase systems as is the case with standard DI.

On the other hand, in a standard LQR formulation without any reference pre-filter, the choice of the weighting matrices Q & R implicitly determines the closed-loop control performance & bandwidth; as the ratio of Q:R is increased, the controller gain and resulting closed-loop bandwidth is increased. However, in the presence of nonlinearities, as the linearized model is updated, a fixed set of Q & R does not suffice to achieve desired performance. This is overcome in the present approach with the use of the reference pre-filter in Eq. 12, and modifying the quadratic tracking penalty to penalize the tracking error from the pre-filtered reference as in Eq. 13. The pre-filter can be designed to completely specify the desired tracking performance (bandwidth, decoupling etc.), and the quadratic objective function in Eq. 13 includes a very small penalty on the control action, i.e., a small control weighting matrix $R = \epsilon \bar{R}$ so as to closely track the desired first-order response specified by the pre-filter.

Another advantage of the proposed robust DI design is that in the standard DI approach for square systems, as the decoupling matrix $C_c B$ approaches singularity and becomes ill-conditioned, e.g., one or more control inputs (reference modification $\Delta r$, in this case) loses its authority in affecting any of the control outputs (active constraints in this case) and the corresponding column in $C_cB$ approaches zero, the matrix inverse also becomes ill-conditioned with increasingly higher gain for this control input with small authority. This is a very undesirable feature of standard DI and can cause loss of stability/robustness. On the other hand, the proposed modified "robust" DI approach deals much better with such a loss of control input authority (and loss in rank of $C_cB$).

In particular, the weighted pseudo inverse $[(C_cB)^TQ(C_cB)+R]^{-1}(C_cB)^TQ$ used in the modified robust DI approach is still well-defined as long as R is positive definite, and in fact the controller gain for the control input with decreasing authority approaches zero (note the trailing term $(C_cB)^TQ$). This is a very desirable feature of the proposed modified "robust" DI approach, since it essentially naturally limits/eliminates any control input with small/zero control authority. Thus, the proposed modified "robust" DI approach allows the design of the MIMO constraint controller 210 to overcome both aforementioned limitations for standard DI controller, and to provide significant benefits in terms of performance, tuning and robustness compared to a standard DI controller. In particular, the proposed "robust" DI approach can be used online to calculate the requisite multivariable controller for the currently identified subset of active constraints $Y_c$.

A significant benefit of the disclosed MIMO constraint controller design is that it allows enforcing multiple input & output constraints simultaneously using all available actuators u (indirectly through the control references r). This is in contrast to the SISO selection-logic based approach that enforces only one constraint (the most limiting one) at a time using a pre-determined dominant actuator. Thus, in the present approach, the burden of enforcing the constraints is shared across all control actuators or control references reducing the impact on any single control output.

Moreover, the weighting matrix R may be chosen to explicitly determine which control outputs are more important and should have higher priority, i.e., minimize their loss of nominal tracking performance when one or more constraints become active. The matrix R may be chosen to be a diagonal matrix, with $R_{ii}$ denoting the weight for the $i^{th}$ control output $y_i$. If the output $y_i$ is deemed to be more important than other controlled outputs, then the corresponding weight thereof may be set appropriately higher than others to minimize the modification of the respective reference $\Delta r_i$. The tuning of the weighting matrix R provides a direct means for trading off the performance of less important controlled outputs in favor of more important ones, when one or more constraints become active.

On the other hand, the weighting matrix Q may be tuned/designed to prioritize the constraints in case of multiple constraints being simultaneously active. In particular, if at any point of time if more than mu (number of control inputs and outputs, and thus control references) constraints become simultaneously active and are "conflicting" in the sense that they can not be all simultaneously satisfied using the mu control actuators, then the weights $Q_{ii}$ can be designed to give preferentially higher emphasis on enforcing a particular constraint limit than other less critical ones.

Unlike the SISO selection-logic based approach, the proposed MIMO constraint controller allows enforcing multiple (up to the number mu of control actuators and references) input and output constraints simultaneously. If fewer than mu constraints are active at any point of time, then the weights for these constraints $Q_{ii}$ are immaterial, since they will all be simultaneously enforced. Similarly, a condition may exist in which several constraints are active but are primarily non-conflicting, i.e., there exists a subset of less than or equal to mu of these active constraints that is currently "limiting" and the remaining constraints will be satisfied and consequently made inactive once this minimal set of limiting constraints is satisfied. In this case, the MIMO constraint controller 210 design, based on weighted least squares (i.e., the minimization of the objective function in Eq. 13) will naturally identify the appropriate minimal set of limiting controllers that need to be active.

The overall steps involved in an exemplary embodiment of the design and implementation of the present MIMO constraint controller for MIMO systems with multiple input and/or output constraints may be summarized as follows:

(1) Design a desired MIMO controller 202 to achieve desired nominal closed-loop tracking performance for the controlled outputs in the absence of any constraints;

(2) Obtain the state-space linearized discrete-time model of the resulting closed-loop system 208 with the process (plant) 206, the MIMO tracking controller 202 and the common integrators 204 to provide integral action, at the current time sample;

(3) Use the closed-loop system model to predict the constraint outputs & inputs a desired time ahead in future to provide appropriate lead/anticipation and compare these predicted values of the constraints against respective min/max values to determine which constraints are currently active at a min or max limit. A small tolerance/hysteresis band may be incorporated around the min/max limits to address issues like noise, constraint chattering or mode contention between active/inactive constraints; and (4) For the currently identified subset of active constraints, calculate the requisite control action (i.e., reference modification) using the above described "robust" DI approach using weighted least squares. If no constraint is active, then the output of the MIMO constraint controller 210 reduces to zero (i.e., produces a zero reference modification ($\Delta r=0$)), and the baseline MIMO tracking controller 202 recovers the design nominal tracking performance.

The disclosed MIMO constraint controller includes explicit design handles to achieve a desired objective. Specifically, these design parameters include:

(1) An amount of prediction time or lead/anticipation for each constraint output. A larger prediction/lead may be used for constraints with faster dynamics and less tolerance for temporary violations past min/max limits.

(2) A tolerance and hysteresis band for evaluating predicted constraint outputs against min/max limits. The tolerance and hysteresis band may be increased to address impact of noise and chattering/active-inactive mode contention.

(3) A weighting matrix R for prioritizing the performance of specific controlled outputs compared to others. A larger weight $R_{ii}$ is used for a more important control output $y_i$, whose tracking performance should be preferentially retained compared to less important outputs in the presence of active constraints.

(4) A weighting matrix Q for prioritizing the enforcement of more critical constraints compared to others. A larger weight $Q_{ii}$ is used for a more critical constraint output $Y_i$ and its min/max limit to preferentially enforce this constraint more stringently compared to other less critical ones. The relative magnitudes of $Q_{ii}$ come into play only if more than mu conflicting constraints become simultaneously active and cannot all be satisfied simultaneously.

As will be appreciated, the disclosed MIMO constraint controller design provides significant advantages with respect to existing SISO constraint handling approaches for input or output constraints. For example, it provides a unified framework for simultaneously handling both input and output constraints together. Also, it provides multi-variable anti-windup protection for MIMO control systems with integral action, keeping all the unsaturated actuators coordinated while enforcing the min/max limits on saturated actuators.

In addition, the constraint controller allows enforcing multiple input and output constraints simultaneously using all available control actuators simultaneously. Thus, the controller is not limited to SISO systems or MIMO systems where it is possible to pre-determine a dominant control actuator that impacts the primary control output and all constraint outputs. By simultaneously using all control actuators and their multivariable interaction, the effort of enforcing the input/output constraints is distributed across the available (unsaturated) actuators, thereby minimizing the impact on any particular controlled output tracking performance. In contrast, the SISO selection-based approach completely sacrifices the tracking performance on the primary control output when enforcing one limiting constraint.

Moreover, a modified "robust" DI approach allows for calculating the control action for the currently identified active subset of constraints despite being a square/non-square system. Also, unlike a standard DI approach, stability is still guaranteed for non-minimum phase systems, under weaker assumptions of stabilizability.

The weighting matrices Q & R provide an explicit means to prioritize the important control outputs whose nominal tracking performance should be maintained as much as possible by the physics of the process dynamics despite the presence of active constraints. Similarly, the critical constraints can be prioritized over less critical ones in case too many conflicting constraints become simultaneously active.

Figure 3:
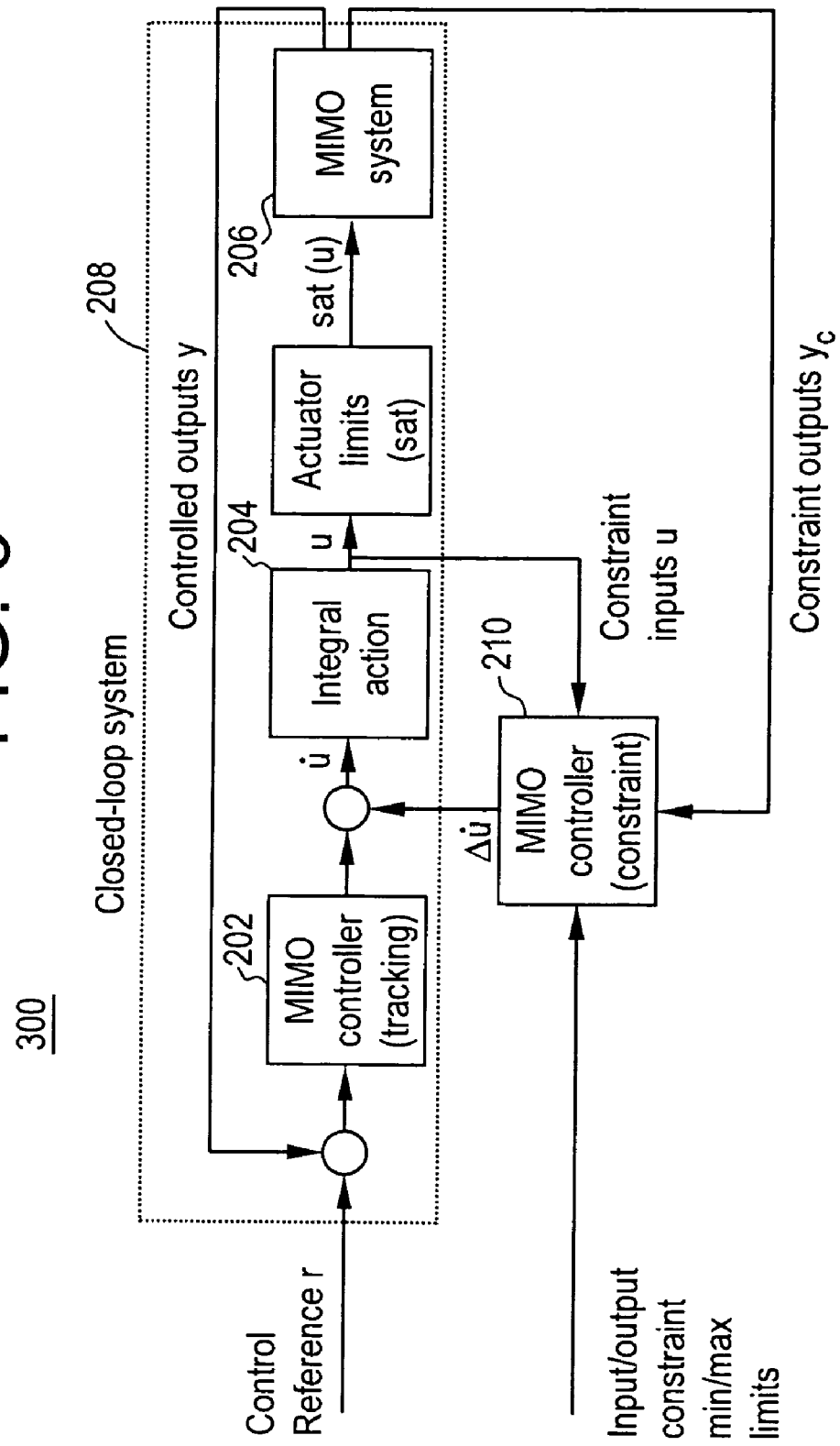
FIG. 3 is a schematic block diagram of the overall architecture of a MIMO control design for MIMO systems with input & output constraints, in accordance with an alternative embodiment of the invention.

Finally, it should be appreciated that, analogous to the control architecture for the proposed MIMO constraint controller shown in FIG. 2, a similar architecture 300 may be configured as shown in FIG. 3, wherein the MIMO constraint controller 210 may be designed to calculate an additional change in the control actuator rates (i.e., $\Delta \dot{u}$), in addition to the base value of $\dot{u}$ obtained from the MIMO tracking controller to enforce active input/output constraints. The implementation of the MIMO constraint controller 210 in this architecture 300 entails a minimization of the objective function:

$$\min\lfloor (r_{cf,k+1} - Y_{c,k+1})^T Q (r_{cf,k+1} - Y_{c,k+1}) + \Delta \dot{u}_k^T R \Delta \dot{u}_k \rfloor \quad \text{Eq. 16}$$

In this formulation, the weighting matrix R is applied to the calculated control action, i.e. $\Delta \dot{u}_k$, where u denotes the control actuators. Thus, the resulting impact on the tracking performance of the controlled outputs is not explicitly tied to this weighting matrix, and it is more difficult to design/tune this weighting matrix to achieve the desired prioritization of controlled output tracking performance. In light of this limitation, the former approach of calculating the reference modifications $\Delta r_k$ from the MIMO constraint controller is preferred.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 2 and 3.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for dynamically controlling a multiple input, multiple output (MIMO) system having multiple input and output constraints, the method comprising:
   a two-step sequential process comprising:
      a first step configuring a MIMO tracking controller to implement closed loop tracking of multiple control reference inputs of the system via an inner control loop, in the absence of input and output constraints; and
      a second step of configuring a MIMO constraint controller via an outer control loop to enforce the input and output constraints of the MIMO system via an explicit analytical formula by generating a reference modification applied to said multiple control reference inputs such that said input and output constraints are dynamically controlled and the reference modification in the MIMO constraint controller is calculated via the explicit analytical formula.

2. The method of claim 1, wherein said configuring said MIMO constraint controller further comprises:
   determining a discrete, linearized model of a resulting closed loop portion of the MIMO system including said MIMO tracking controller for a current time sample;
   predicting, using said linearized model, constraint input and output values at a desired future time with respect to said current sample time, and comparing the predicted values to respective minimum and maximum values of the input and output constraints so as to determine whether any of said input and output constraints are active; and
   based on the determination of any active input and output constraints, calculating said reference modification using a robust dynamic inversion (DI) technique.

3. The method of claim 2, wherein said closed loop portion of the MIMO system includes integral action that is not bounded by said input constraints.

4. The method of claim 2, wherein said robust DI technique utilizes weighted least squares to generate a weighted pseudo-inverse matrix so as to provide stability for non-square system conditions.

5. The method of claim 4, wherein said robust DI technique further comprises:
   determining a first positive definite weighting matrix, R, for prioritizing tracking performance of multiple control outputs of the system; and
   determining a second positive definite weighting matrix, Q, for prioritizing enforcement of said constraint outputs.

6. The method of claim 5, wherein said weighted pseudo-inverse matrix is of the form:

$$[(C_cB)^TQ(C_cB)+R]^{-1}(C_cB)^TQ,$$

wherein $C_cB$ represents the decoupling matrix for the MIMO system.

7. The method of claim 1, wherein said MIMO constraint controller is configured to calculate a change in actuator control input rates to be applied to corresponding base values outputted by said MIMO tracking controller.

8. A control architecture for a multiple input, multiple output (MIMO) system having multiple input and output constraints, comprising:
   a MIMO tracking controller configured to implement a first sequential step of closed loop tracking of multiple control reference inputs of the system via an inner control loop, in the absence of input and output constraints; and
   a MIMO constraint controller configured to implement via an outer control loop a second sequential step of enforcing the input and output constraints of the MIMO system via an explicit analytical formula by generating a reference modification applied to said multiple control reference inputs such that said input and output constraints are dynamically controlled and the reference modification in the MIMO constraint controller is calculated via the explicit analytical formula.

9. The control architecture of claim 8, wherein said MIMO constraint controller is configured to:
   utilize a discrete, linearized model of a resulting closed loop portion of the MIMO system including said MIMO tracking controller for a current time sample;
   predict, using said linearized model, constraint input and output values at a desired future time with respect to said current sample time, and compare the predicted values to respective minimum and maximum values of the input and output constraints so as to determine whether any of said input and output constraints are active; and
   based on the determination of any active input and output constraints, calculate said reference modification using a robust dynamic inversion (DI) technique.

10. The control architecture of claim 9, wherein said closed loop portion of the MIMO system includes integral action that is not bounded by said input constraints.

11. The control architecture of claim 9, wherein said robust DI technique utilizes weighted least squares to generate a weighted pseudo-inverse matrix so as to provide stability for non-square system conditions.

12. The control architecture of claim 11, wherein said robust DI technique further comprises:
   determining a first positive definite weighting matrix, R, for prioritizing tracking performance of multiple control outputs of the system; and
   determining a second positive definite weighting matrix, Q, for prioritizing enforcement of said constraint outputs.

13. The control architecture of claim 12, wherein said weighted pseudo-inverse matrix is of the form:

$$[(C_cB)^TQ(C_cB)+R]^{-1}(C_cB)^TQ,$$

wherein $C_cB$ represents the decoupling matrix for the MIMO system.

14. The control architecture of claim 8, wherein said MIMO constraint controller is configured to calculate a change in actuator control input rates to be applied to corresponding base values outputted by said MIMO tracking controller.

15. A storage medium, comprising:
   a machine readable computer program code for dynamically controlling a multiple input, multiple output (MIMO) system having multiple input and output constraints; and
   instructions for causing a computer to implement a two-step sequential method, the method further comprising:
      a first step of configuring a MIMO tracking controller via an inner control loop to implement closed loop tracking of multiple control reference inputs of the system, in the absence of input and output constraints; and
      a second step of configuring a MIMO constraint controller via an outer control loop to enforce the input and output constraints of to MIMO system via an explicit analytical formula by generating a reference modification applied to said multiple control reference inputs such that said input and output constraints are dynamically controlled and the reference modification in the MIMO constraint controller is calculated via the explicit analytical formula.

16. The method of claim 15, wherein said configuring said MIMO constraint controller further comprises:
   determining a discrete, linearized model of a resulting closed loop portion of the MIMO system including said MIMO tracking controller for a current time sample;
   predicting, using said linearized model, constraint input and output values at a desired future time with respect to said current sample time, and comparing the predicted values to respective minimum and maximum values of the input and output constraints so as to determine whether any of said input and output constraints are active; and
   based on the determination of any active input and output constraints, calculating said reference modification using a robust dynamic inversion (DI) technique.

17. The method of claim 16, wherein said closed loop portion of the MIMO system includes integral action that is not bounded by said input constraints.

18. The method of claim 16, wherein said robust DI technique utilizes weighted least squares to generate a weighted pseudo-inverse matrix so as to provide stability for non-square system conditions.

19. The method of claim 18, wherein said robust DI technique further comprises:
   determining a first positive definite weighting matrix, R, for prioritizing tracking performance of multiple control outputs of the system; and
   determining a second positive definite weighting matrix, Q, for prioritizing enforcement of said constraint outputs.

20. The method of claim 19, wherein said weighted pseudo-inverse matrix is of the form:

$$[(C_eB)^TQ(C_eB)+R]^{-1}(C_eB)^TQ,$$

wherein $C_eB$ represents the decoupling matrix for the MIMO system.

21. The method of claim 15, wherein said MIMO constraint controller is configured to calculate a change in actuator rates to be applied to corresponding base values outputted by said MIMO tracking controller.

* * * * *